United States Patent [19]

Trimble et al.

[11] 4,206,866

[45] Jun. 10, 1980

[54] APPARATUS AND METHOD FOR PRODUCING HIGH SENSITIVITY MAGNETOCHEMICAL PARTICLES

[75] Inventors: Lyne S. Trimble, North Hollywood, Calif., by Florence A. Naylor

[73] Assignee: by said Florence A. Naylor said Lyne S. Trimble, North Hollywood, Calif.

[21] Appl. No.: 898,975

[22] Filed: Apr. 21, 1978

[51] Int. Cl.$^2$ .................... B23K 1/12; B23P 25/00
[52] U.S. Cl. ..................... 228/172; 228/5.1; 228/49 R; 228/212; 228/101; 29/424; 29/458; 29/608; 156/380; 156/559
[58] Field of Search ............ 228/5.1, 172, 47, 49, 228/213, 101, 212; 156/380, 552, 555, 559, 560, 561; 29/424, 420, 458, 608

[56] References Cited

U.S. PATENT DOCUMENTS

| | | | |
|---|---|---|---|
| 1,404,567 | 1/1921 | Bensen | 156/552 X |
| 1,763,494 | 6/1930 | Yinger | 156/561 X |
| 2,975,822 | 3/1961 | Gent et al. | 156/552 |
| 3,607,569 | 9/1971 | Greenwell | 156/380 X |
| 3,911,552 | 10/1975 | Trimble et al. | 228/213 X |
| 4,079,509 | 3/1978 | Jackson et al. | 228/180 A X |
| 4,110,758 | 8/1978 | Nelson et al. | 346/74.1 |

Primary Examiner—Daniel C. Crane
Assistant Examiner—K. J. Ramsey
Attorney, Agent, or Firm—Robert M. McManigal

[57] ABSTRACT

Improved apparatus and method for continuously producing high sensitivity magnetochemical particles consisting of joined pairs of pre-oriented magnetic metallic spheres which have been heat treated, magnetically annealed, then plated with color forming metals and overcoated with a chemically resistant coating. These spheres are vibratorially and frictionally seated in surface dimples impressed on the opposed surfaces of a film formed in a mobius loop. The dimples are formed in back-to-back registry by passing the film material through mirror image half-tone screen carrying impressing cylinders. A resin coating applied to the surface of the film loop encases and binds the spheres into mirror image groups; and while the resin coating is still fluid, a directional magnetic field is applied to rotate and orient the encased spheres so that their preferred directions for magnetic field propagation are parallel to the surface of the film loop. The resin coating is dried, then adhesed to a take-off film which strips the resin coating, dimple projections and encased spheres from the mobius loop film surface. The dimple projection surfaces are then abraded to cut through the resin and magnetic metal spheres and expose color forming metal surface areas which are then tinned with solder. Two mirror image portions of the take-off film with the solder tinned resin projections are then assembled so that they are in mirror image confronting relationship with the tinned surfaces of confronting spheres engaged. By the application of heat, the solder is melted and the spheres thus soldered together to form connected spheres. The take-off films are now stripped away, and the resin material dissolved in a solvent from which by decanting and washing high sensitivity magnetochemical particles are recovered.

31 Claims, 11 Drawing Figures

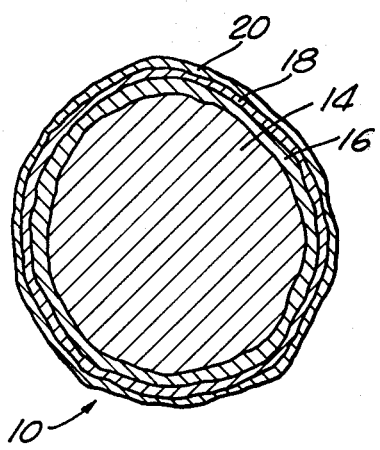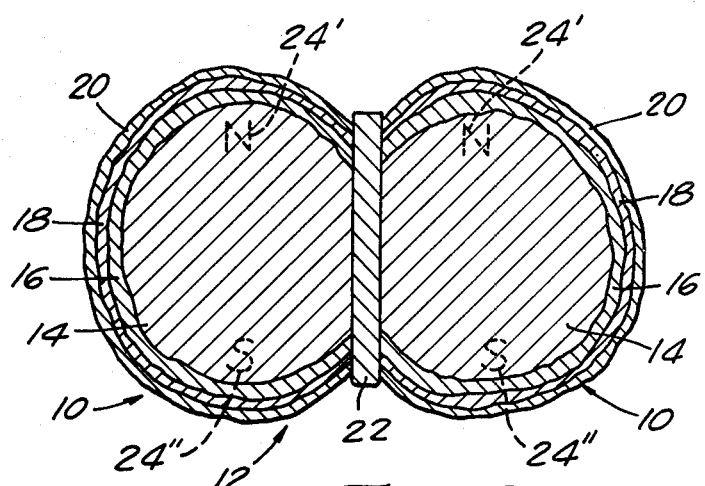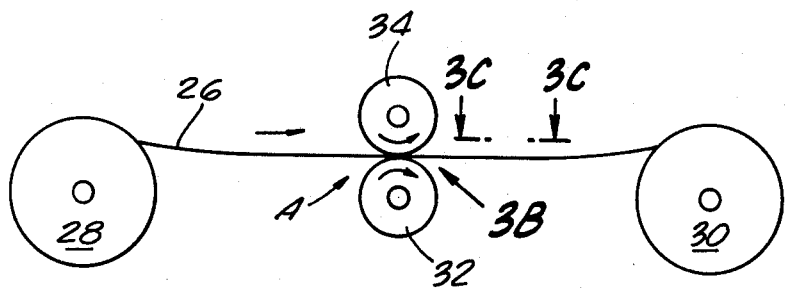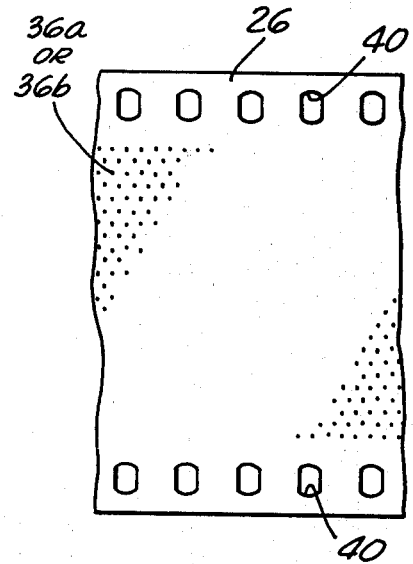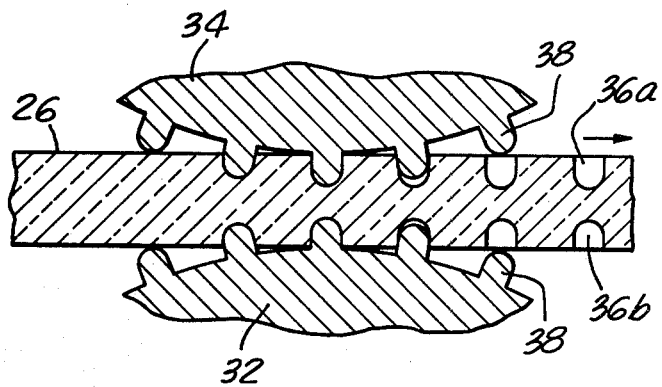

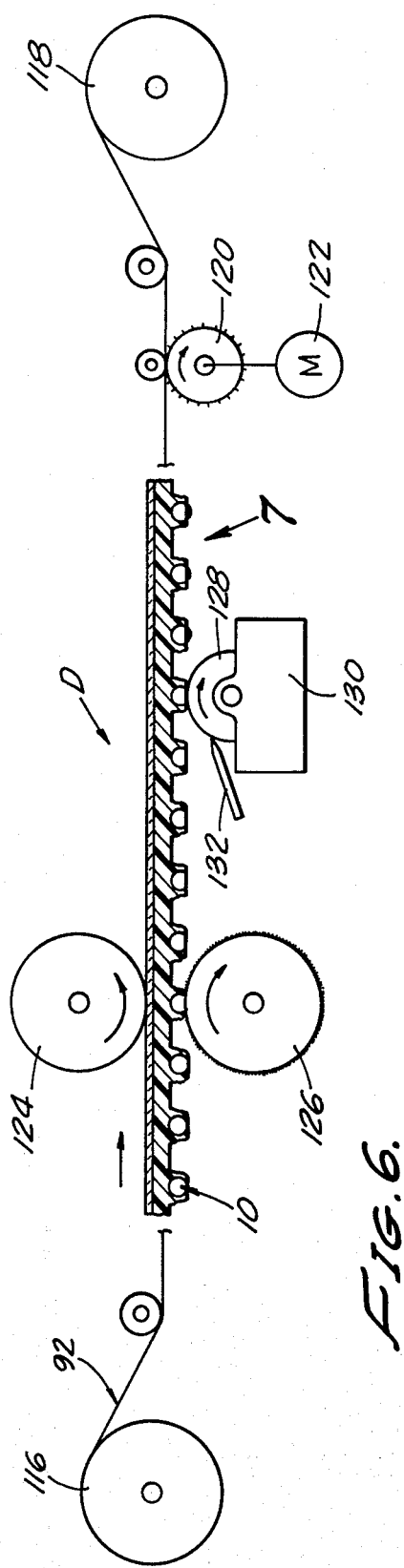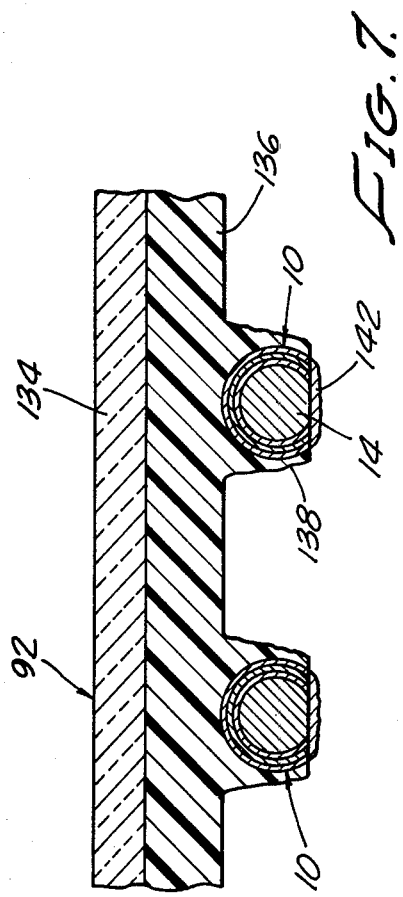

APPARATUS AND METHOD FOR PRODUCING HIGH SENSITIVITY MAGNETOCHEMICAL PARTICLES

BACKGROUND OF THE INVENTION

The present invention is broadly concerned with the production of magnetochemical particles which can be magnetically stimulated to produce visible displays, and in particular color displays.

Magnetochemistry is the utilization of magnetic field forces to trigger spontaneous chemical reactions, and the background of this art is to be found in the prior U.S. Pat. Nos. 3,281,669; 3,512,169; 3,882,507; 3,911,552; and 3,922,687. The last three patents disclose and describe the structure of high sensitivity magnetochemical particles in which two plated, pre-oriented magnetic metal spheres and joined with their directions of orientation in parallel relation, and such that, when placed in a suitable chemical environment and subjected to a magnetic field, opposing forces are generated between the spheres causing them to spring apart and thereby initiate a chemical reaction between the exposed junction of the spheres and a surrounding chemical environment.

The patents further teach that these triggering elements may be incorporated into color forming liquids suspended in droplet form in a resin medium coated upon a support material. Visual patterns in color are produced from the exposure of the coated material to an appropriate magnetic field.

The above-mentioned U.S. Pat. No. 3,882,507 discloses and teaches the broad concept of positioning and aligning plated magnetic metal spheres so that their preferred directions of orientation for magnetic field propagation are parallel, and while so positioned abrading small surface areas of the spheres, then bonding the two spheres together to provide discrete pairs of such tiny magnetic metal spheres as illustrated by FIGS. 2, 3, 4 and 5 of the patent.

SUMMARY OF THE INVENTION

The present invention is an improvement and a simplification of the previously known technique for preparing joined pairs of magnetic metal spheres as disclosed and described in U.S. Pat. No. 3,882,507; and whereby it is possible to prepare such joined pairs on a continuous mass production basis.

In its broad concept, objects of the present invention include:

a. The provision of unique means for making a film strip having dimples impressed in mirror image registered alignment between the opposite surfaces thereof, said dimples being of a size capable of containing a single magnetic metal sphere of the character disclosed in U.S. Pat. No. 3,882,507.

b. The provision of means for utilizing the above-described film strip upon a continuous basis and in the form of a driven mobius film loop such that as the film advances, the opposite surfaces of the film will be alternately presented in the same direction.

c. Provision of unique means for seating a plurality of magnetic metal spheres respectively in the surface dimples of the film loop as it is advanced.

d. The provision of means for filling the surface dimples of a film loop withh spheres, while avoiding the problem of excess sphere accumulation.

e. The provision of means for applying a fluid resin binding coating uniformly over an advancing film surface with dimples respectively seating a metal sphere, in a manner to provide a continuous film such that the resin flows into and around the tiny sphere in each dimple.

f. To pass the sphere loaded film through a directional magnetic field of such strength that the magnetic metal spheres will be caused to rotate in the fluid resin and become aligned with their preferred direction axes parallel to the surface of the film.

g. To provide air flow and temperature control over the surface of the resin, such that the solvent is evaporated from the resin without causing surface skinning, and in such a manner as to leave a smooth dry resin binding layer over the dimpled portion of the film.

h. The provision of means for applying a thin adhesive to a surface of an equivalent take-off film material, but one devoid of dimples, then bringing the adhesive surface of this take-off film into registered contact with the surface of the binding resin layer on the dimpled film loop containing the tiny spheres.

i. To provide means for registering the film of the loop and the take-off film by means of edge perforations and a substantially full fitting register pins on a drive belt, such that the two films are in absolute registration by virtue of the substantially full fitting pins engaging identical edge perforations of the two films.

j. To provide means for separating the adhesed take-off film from the dimpled film loop during continuous advance of the registered films, such that the binding resin coating, dimple projections and encased spheres will be removed from the film loop surface which is then returned to receive another charge of metal spheres.

k. The provision of means for abrading or grinding away a very small surface of the projections formed in the dimples of the film loop such that small amounts of resin will be removed as well as a small amount of metal from the magnetic metal spheres contained in the dimpled projections.

l. To provide means for tinning, without a solder flux, the metal surfaces exposed by abrading or grinding, so that each such metal surface receives a tiny droplet of molten solder which then solidifies.

m. The provision of means for aligning the abraded and tinned surfaces on confronting faces of the take-off films, which have been prepared from opposite sides of the film loop, such that the dimple formed projections are mirror images of one another and the projections of one surface exactly match the projections on the companion surface.

n. Provide means for advancing these two take-off film surfaces past a heat source such that the solder droplets are melted.

o. Provide means for bringing the two confronting tinned surfaces into contact in register, by means of an advancing, substantially full fitting register pin belt engaging the film perforations of the two take-off films, to cause a soldered joint between each pair of aligned spheres, without the use of a solder flux.

p. The providing of a heat sink, such that the molten solder junction between the two mirror image projections as well as the metal spheres are properly cooled to form a firmly soldered joint.

q. To provide means for simultaneously stripping the two base film supports from the two interconnected resin coatings containing the pairs of soldered spheres.

r. Provide means for dissolving the resin coating material in a solvent, followed by decanting the solvent, and recovering the tiny identical particles with magnetically oriented metal sphere pairs.

Further objects and advantages of the invention will be brought out in the following part of the specification, wherein detailed description is for the purpose of fully disclosing an embodiment of the invention without placing limitations thereon.

DESCRIPTION OF THE DRAWINGS

FIG. 1 is an enlarged cross sectional view diagrammatically illustrating a magnetic metallic sphere such as utilized in accordance with the present invention;

FIG. 2 is an enlarged view diagrammatically disclosing a particle of the character produced in accordance with the present invention;

FIG. 3A is a view diagrammatically illustrating a mechanism for applying mirror image dimples to a film strip in accordance with the present invention;

FIG. 3B is a fragmentary enlarged sectional view of the area indicated at 3B of FIG. 3A, showing the means for producing the dimples in the film strip;

FIG. 3C is an enlarged fragmentary view of the resulting film strip, as viewed substantially along the line 3C—3C in FIG. 3A;

FIG. 6 is a side elevational view diagrammatically illustrating the mechanism for abrading and tinning the spheres;

FIG. 7 is an enlarged fragmentary view of the film structure in the area indicated at 7 in FIG. 6;

DESCRIPTION OF A PREFERRED EMBODIMENT

The Produced Particle

Figure 4:
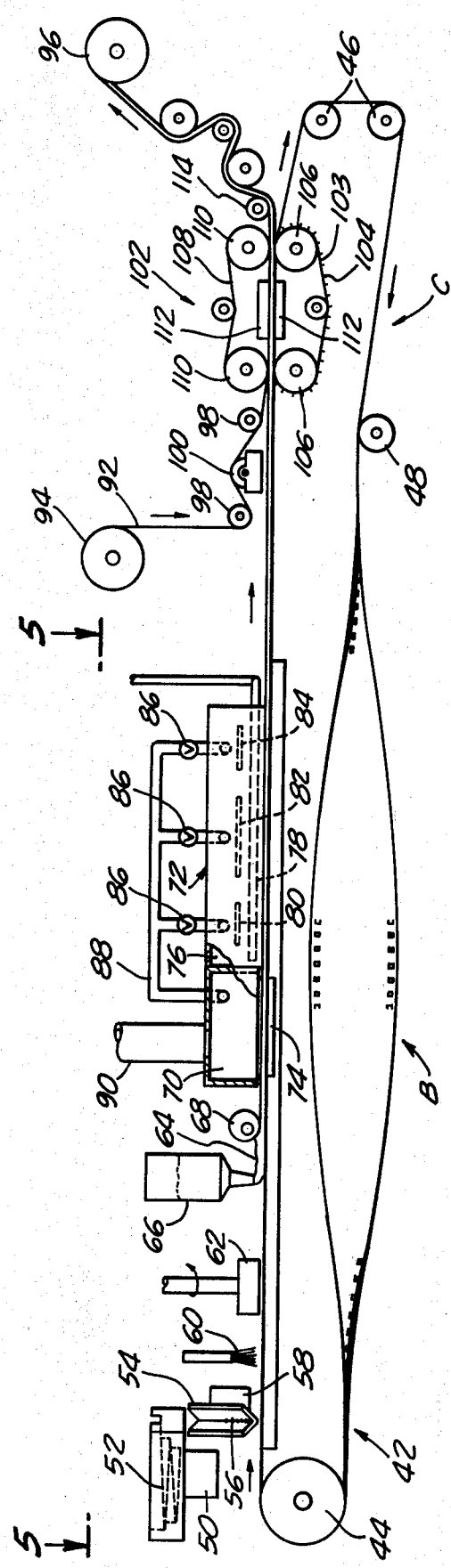
FIG. 4 is a side elevational view diagrammatically illustrating the mechanism for forming and securing the magnetic metal spheres into mirror image groups, and take-off and stripping means for removing the mirror image groups.
Figure 5:
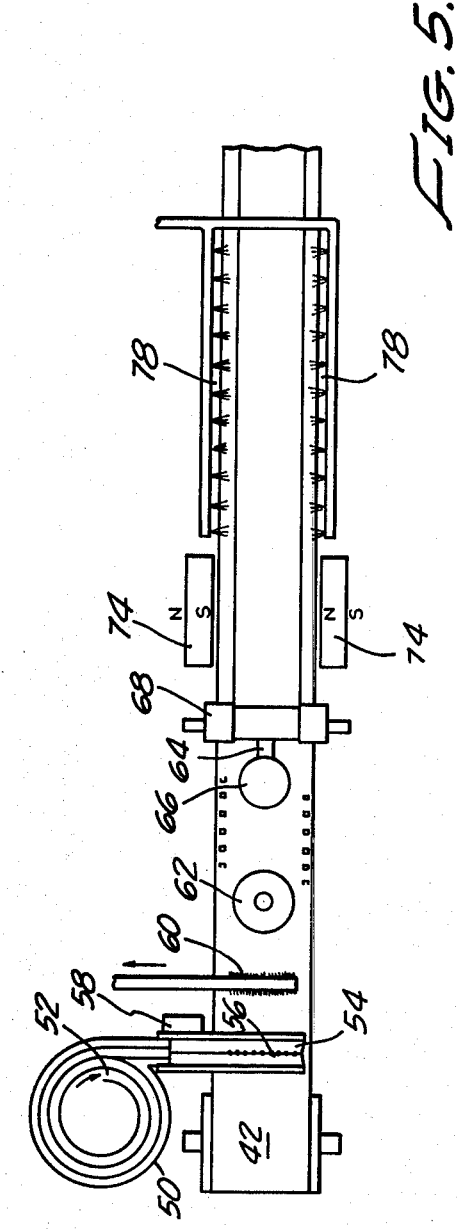
FIG. 5 is a fragmentary plan view diagrammatically illustrating the components as viewed along line 5—5 of FIG. 4, and showing details of the means for magnetically orienting the spheres.

Referring more specifically to the drawings, there is shown in FIG. 1, a mass of ferromagnetic material in the form of a sphere, as generally indicated by the numeral 10, which forms a basic component for the production of particles such as indicated by the numeral 12 in FIG. 2. The structural details of both the spheres and the particle utilizing such spheres have been fully explained in the previously mentioned U.S. Patents, and in particular U.S. Pat. No. 3,882,507, which is incorporated by reference into the present application.

However, it may be noted briefly that the sphere 10 basically comprises a ferromagnetic core 14 wich is successively surrounded by a thin film 16 of a ductile metal capable of forming a salt of a desired color when exposed to a suitable chemical environment. A frangible protective coating 18 of antimony, copper and/or copper oxide surrounds the film 16. The frangible coating 18 is in turn surrounded by an outer film coating 20 of tin for the purpose of masking the reflective copper tint from the coating 18, when copper is used therein.

As shown in FIG. 2, the particle 12 comprises a pair of the spheres 10, as shown in FIG. 1, which have been joined together by a fusible alloy 22 such that satisfactory resistance to the color forming chemicals is provided. As thus joined, the direction of orientation of the adjacent magnetic spheres is parallel, and when subjected to a magnetic field, the magnetostrictive forces produce a dimensional change tending to weaken or destroy the bond between the iron and copper layers 16 and 18, respectively. Magnetic induction establishes like poles in adjacent areas of the spheres, as shown by the phantom lines 24' and 24", and these have sufficient force of repulsion to rupture the protective film and allow the spheres to peel apart.

The present invention is primarily concerned with improved apparatus and method which will permit the production of the magnetochemical particles, as shown in FIG. 2, on a continuous mass production basis, and the combination of mechanisms for this purpose will now be described in detail.

Mechanism for Applying Mirror Image Dimples to a Film Strip

As generally indicated at A in FIG. 3A, this mechanism comprises a film strip 26 which is fed from a supply reel 28 to a take-up reel 30 through a pair of rotatably mounted impression forming cylinders 32 and 34.

As shown in FIG. 3B, the cylinders 32, 34 comprise a rotary press arrangement for impressing dimples 36a and 36b in register upon the opposite sides of the film 26 of plastic or other suitable material in a manner such that the dimples 36a form a mirror image group with respect to the mirror image group formed by the dimples 36b. The surface of each cylinder carries a half-tone screen of 200 dots per inch comprising raised posts or projections 38 that are substantially one thousandths of an inch in diameter and two thousandths of an inch long. These cylinders can be prepared by conventional photo engraving techniques; however, more consistent results have been obtained by preparation of mirror half-tone screen plates by photo engraving techniques, then mounting the plates on brass of bronze cylinders. In either case, a photographic master pattern is prepared by step and repeat dot printing techniques, generally double size and upon a glass base. The dot size and spacing can be accurate to 50 millionths of an inch. A negative is made by contact printing from the half-tone screen master, and synchronization marks as well as length and width restrictions incorporated. A second negative is made through the base of the master to duplicate the first negative in every way except that this second negative is a mirror image of the first negative. With satisfactory negatives at hand a double size reduction is made to form photo tool positives.

Although a number of etchable materials can be used for the plates, there are certain advantages in using 0.010 inch thick copper, e.g. a tight bond is formed with the resist, the metal is not difficult to etch, and the etched product is quite uniform in pattern quality. It has been found that brass, bronze, and several alloys of copper and brass do not etch uniformly. Although steel and the like can be used there are problems in uniformly mounting steel plates upon the cylinders. After the half-tone screens have been etched upon the surface of the copper plates, the reverse side of each plate is treated with photo engraving resist and a reversed pattern is etched on the back. The plates are then cut to size and if necessary precision ground to size to fit upon the cylinders.

It is now desirable to apply a conventional solvent base electroplating resist, such as Microshield, to the half-tone screen surface of both plates, as well as to the edges and to the insides of the two cylinders that are to receive and retain these plates. The non-coated areas, that is the back of each half-tone screen plate which has been etched to provide for the accumulation of excess solder and the land area around each cylinder that will receive the plate, are electro-plated to deposit one tenth to two tenths of a thousandths of an inch thickness of solder. A number of solders can be used, however, very good results have been obtained with conventional #640 (60-40) solder melting at 350° F. Both plates and both cylinders are then cleaned with solvent to remove all traces of the electroplating Microshield, the plates are wiped with solder flux, and wrapped around their respective cylinders so that the two plated solder areas come into contact. The width of each plate and the land on the cylinder have been selected so that there is a close fit of each plate into the cylinder groove leaving the 0.002 inch projections extending above the edges of the cylinder. The lengths of the plates have been established so that there is an exact match of projections, row to row, as the ends of each plate join when wrapped around each cylinder. Each cylinder and wrap around plate is then placed in a compression tool which holds the plate in position against the cylinder. The compression tool, cylinder and plate are put into a heat treating chamber, the chamber evacuated, then filled with hydrogen. The chamber and contents are heated above the 350° F. melting point of the solder and allowed to remain at this temperature for 30 minutes in a flow of hydrogen. The chamber is then cooled to room temperature and the compression tool removed. Melting of the solder and the pressure due to the expansion of the metals during heat treating establishes a tight bond between the plate and the cylinder. The cylinders are removed from the compression tool, the electroplating resist applied to the edges and the insides of the cylinders, then the cylinders are electroplated with five tenths of a thousandths of an inch of hard chrome. This gives the tiny projections a firm polished finish which serves to withstand forces encountered during dimpling of the film strip material.

The cylinders 32 and 34 are preferably centrally mounted upon rotatable mandrels, and appropriate adjustments are provided to permit slight rotation and side motions on the mandrel to bring the half-tone screens into absolute registration with each other. Calibration is conducted by passing an 0.07 inch thick film of Cronar belt material between the two cylinders, which are adjusted so as to be just short of contact, and with the aid of a microscope, viewing the dimples impressed in the Cronar. Any alignment or misalignment of the dimples becomes immediately evident, and only very slight adjustments in rotation or side motion of one cylinder will be necessary to bring them into alignment so that a continuous length of belt can be impressed on each side with dimples approximately 0.001 inch in diameter. Since the plastic of the film has some memory and is capable of relaxation, a 0.002 inch long projection is required in order to obtain a 0.001 inch dimple.

The above-described mechanism is capable of producing a continuous length of film strip 26 as shown in FIG. 3C with dimpled opposite surfaces. The film strip also has longitudinally spaced perforations 40 along each edge margin. Although Cronar has been utilized as the film material because of its availability, the material may be conventional 70 mm leader stock manufactured by Eastman Kodak, DuPont or others serving the motion picture industry. The dimples are impressed in a two inch wide central portion of the film strip and extend to within about ⅛th inch of the perforations. Moreover, it is not essential that the film material be plastic. A metal that can be similarly impressed with the dimples would be equally satisfactory. Likewise, there are no restrictions on the thickness of the film material; however, the 0.007 inch thickness has been found substantially strong and easy to handle, and a width of 70 millimeters, allowing a two inch area for dimples, has been found convenient to use.

An appropriate length of the dimple carrying film 26, as shown in FIG. 3C is formed into an endless film mobius loop by twisting one end 180° prior to splicing. This loop, as generally indicated in FIG. 4 by numeral 42, is utilized to form a conveyor assembly in which the loop is carried around a rotatable support 44 at the loading end of the conveyor, and around a series of guide rollers 46 at the delivery end. The conveyor loop thus provides an upper run in which the loaded spheres 10 will be conducted through a series of operations, and a lower return run in which the interchange of the belt surface occurs between a guide roller 48 and the rotatable support 44. The unit disclosed in FIG. 4 consists of a loading end mechanism, as generally indicated at B, for assembling and binding the spheres 10 in mirror image groups, and a take-off stripping mechanism, as generally indicated at C, at the delivery end of the conveyor loop.

Mechanism for Assembling and Binding the Spheres in Mirror Image Groups

At the loading end of the upper run of the belt 42, a vibrating feeder 50 containing a load of spheres 10 will cause the spheres to climb a spiral ramp path 52 and be discharged in a single line stream into one end of a V-shaped hopper 54 that extends above and transversely of the belt. Adjustment of the vibration rate of the feeder 50 permits the delivery of spheres to be increased or decreased, as desired. The hopper is made of brass or other suitable non-magnetic material, and is provided with a series of tiny discharge holes at its bottom which allow the spheres to pass through and drop upon the upper surface of underlying moving belt. Further feed control is obtained by mounting the hopper 54 upon a linear vibrator 56.

The deposited spheres from the hopper 54 are carried by the belt under a series of reciprocating very fine brushes 60 which serve to spread the spheres uniformly over the dimpled surface of the belt. As a result of this action, a number of dimples will receive and retain a single sphere. In order to fill the remaining dimples, a disc 62 having a rubber covered under-surface is arranged to be slowly rotated above the belt surface in such proximity that the spheres will be contacted and rolled around until all the empty dimples are filled.

By properly adjusting the feed rate of the vibratory feeder 50, substantially all of the dimples in the belt will contain a single magnetic metal sphere, and no spheres will remain upon the belt surface. It has been found that, if the supply is held to just under the quantity required to fill the dimples, the rate of the feed can be slowly increased to achieve a balance where each dimple in the belt contains a single sphere.

A controlled stream of fluid resin composition 64 from a supply source 66 is applied and spread over the dimpled area of the belt surface by an adjustable gardner bar 68 to form a coating of the desired thickness. Several coating controls may be utilized, if desired, and both gardner bars and blades have been satisfactory.

The resin composition and viscocity, to be discussed below, have been selected so that a uniform thickness approximating 0.010 inches can be applied over the surface of the dimpled belt and yet permit the resin to flow down into each dimple to encase the sphere therein, and which is capable of drying with a smooth surface to provide a film exhibiting minimum shrinkage for a period of substantially 8 hours. Although there are several resin compositions that are suitable for this purpose, best results have been obtained with an acrylic-vinyl mixture comprising:

Acryloid B-72 (Rhom&Hass)—6 pbw
Acryloid A-11 (Rhom&Haas)—18 pbw
Vinyl VYHH (Union Carbide)—12 pbw
Methyl Ethyl Ketone—64 pbw When applied at 0.010 inches in thickness, this resin composition will dry to a 0.0025 to 0.003 inch thick film in a flow of warm air.

As the belt continues to advance the resin coating and the resin covered spheres 10 in the dimples are carried into a magnetization chamber 70, at the proximate end of a dry box 72, where they pass between two plastoid magnets 74. These magnets are in the form of transversely magnetized bars and are positioned on opposite sides of the belt 42 with their opposite poles in facing direction so that a directional magnetic field of 30 to 60 oersteds is established across the belt surface at right angles to its direction of travel. As the magnetic metal spheres 10 pass through this magnetic field, the spheres are automatically rotated so that their preferred axes for magnetization will align in a parallel relation to the magnetic field direction. This rotation and alignment of the spheres occurs before the evaporation of the solvent in the resin has allowed it to become sufficiently viscous to prevent the easy rotation of these spheres. The aligning field is not sufficient to produce an appreciable residual magnetization of the metallic spheres.

The magnetically aligned spheres and resin coating next go through an elongate chamber 76 of the dry box 72. Air from a blower is introduced at the opposite sides of the chamber 76, as indicated at 78, so as to flow over the surface of the resin to evaporate the solvent and dry or harden the acrylic mixture. Within the chamber, the air is heated by a succession of electric plate heaters 80, 82 and 84. These heaters are preferably graduated so that the air will be heated less by the heaters 80 and 84 than by the heater 82. Air discharge from the respective heater areas is regulated and relatively adjustable by means of separate outlet valves 86 connected with a common conductor 88 which carries warm air into the magnetization chamber 70 which has an air exhaust outlet 90. The temperature of the resin coating leaving the dry box will be substantially at the ambient temperature.

Take-Off and Stripping Mechanism

In this mechanism a 0.004 inch thick Cronar film strip 92, which is otherwise identical to the film strip 26, is fed from a supply reel 94 through an operative path to a take-up reel 96. As shown, the film strip is guided by guide rollers 98, 98 over an applicator dipping roller 100 that serves to apply a thin film of Eastman Kodak film lacquer #266, or other suitable material, to the under surface of the film. This lacquer serves as an adhesive to bond the film strip 92 to the resin coating on the upper surface of the mobius film loop 42 as the two films are moved into registered contact by a device, as generally indicated by the numeral 102. The film registration means comprises a steel belt 103 carrying substantially full fitting metal pins 104 that are adapted to enter the marginal edge perforations 40 of the two films and bring them into very accurate registration. These film perforations and belt pins are accurate to several millionths of an inch and have been used in film registration systems in the motion picture industry for many years. The belt 103 is trained over spaced rollers 106. A Mylar keeper belt 108 is trained over spaced rollers 110, and rides on top of the pin belt 103. The two films as thus registered are passed between opposed pressure plates 112 which contribute to the bonding operation.

As the two bonded together films leave the device 102, the film 42 is moved in a downwardly inclined path over the proximate guide roller 46, while the film strip 92 with the resin coating adhesed thereto is conducted over a series of guide rollers, including the roller 114, into an upwardly inclined path leading to the take-up reel 96. This produces a separation or stripping action in which the resin coating together with the dimple formed projections having the spheres at their ends, are now carried by the film 92 instead of the mobius film loop 42.

The unloaded mobius film loop 42 is now returned to the loading end of the conveyor to receive a new load of spheres 10 on the reverse side of the film loop, which is now exposed. It is thus clear that, if the film strip 92 accumulating on the reel 96 is withdrawn and cut at any splice mark impression of the mobius loop 42, as clearly appears on the resin film, and the two portions matched in face-to-face relation in the direction of travel, they will be mirror images of each other. There is no restriction therefore in the length of the finished film 92 that can be accumulated on the take-up reel 96. As discussed above, the dimpled film strip loop 42 operates continuously and will generate in successive operating cycles, as many feet of alternate mirror image groups of plastic projections carrying spheres at their ends, as may be desired. Although the finished take-off film 92 can be cut at any time, it is usually kept intact until it has been put through the abrading and tinning mechanism D, which will now be described.

Abrading and Tinning Mechanism

In the abrading and tinning mechanism D, as shown in FIG. 6, the finished take-off film strip 92 from the take-off and stripping mechanism C, is fed from a supply reel 116 in a processing path to a take-up reel 118. Any suitable means may be utilized to propel the film, but in the present instance a drive roller 120 having pins at its ends for engaging the edge perforations 40 of the film, is driven by a connected electric motor 122. As shown, the film 92 is oriented so that as it leaves the reel 116, the dimple formed resin projections with the spheres at their ends will extend in a depending position. The film is first passed between a rotatable pressure roller 124 and operatively associated rotatable roller 126 having an outer surface of abrasive material adapted to abrade the end surface of the resin projections and the magnetic metal spheres 10 held in these projections, in order to expose in each case a small abraded area of color forming metal. Adjustment of the pressure roller 124 against the film strip provides control means for determining the extent of abrasion. It is the general practice to abrade to a depth of approximately one-fourth the diameter of the sphere, although abrasions of lesser or greater depths are possible and are used in the practice of the present invention. The abrading process exposes the Alnico 5 surface and the rings of material plated around it, which can include cobalt, iron, copper, nickel and the chemically resistant nickel-tin outside layer as more fully disclosed and discussed in the previously mentioned patents. Following the abrading operation, the film 92 is advanced to bring the abrading operation, the film 92 is advanced to bring the abraded areas into engagement with the outer surface of a tinning roller 128 of copper, which is partially submerged in a small solder pot 130, and upon rotation will operate to transfer a thin film of the molten solder to the abraded areas. A thin blade 132 evens the molten solder over the roller surface. The time interval between the application of the molten solder and taking up the film on the reel 118 is sufficient to permit the solder to harden. The application of the solder must be carefully controlled, because the subsequent junction of the two joined spheres must be complete to prevent chemical solution penetration into the solder bond between the two spheres. However, this control is not difficult to establish, and a uniform and effective junction is obtained with very little excess solder around the edges.

The finished take-off film 92 as produced in the above-described mechanism is shown in enlarged form in FIG. 7 wherein the base carrier film is indicated at 134, the resin coating at 136, the dimple formed projection at 138, the abraded surface at 140, and the applied solder film at 142.

Sphere Joining and Particle Recovery Mechanism

Figure 8:
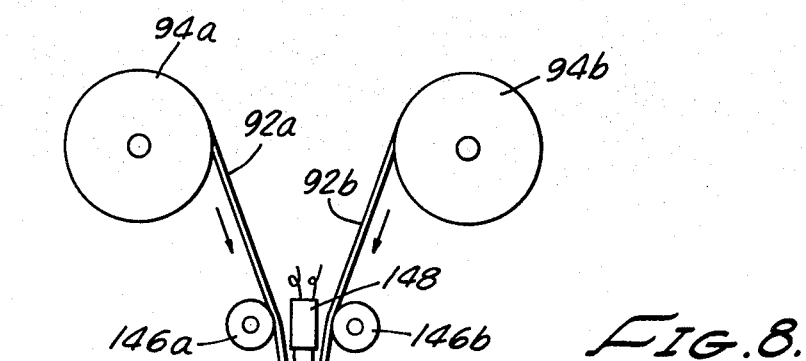
FIG. 8 is an enlarged view diagrammatically illustrating the sphere joining and particle recovery mechanism.
Figure 9:
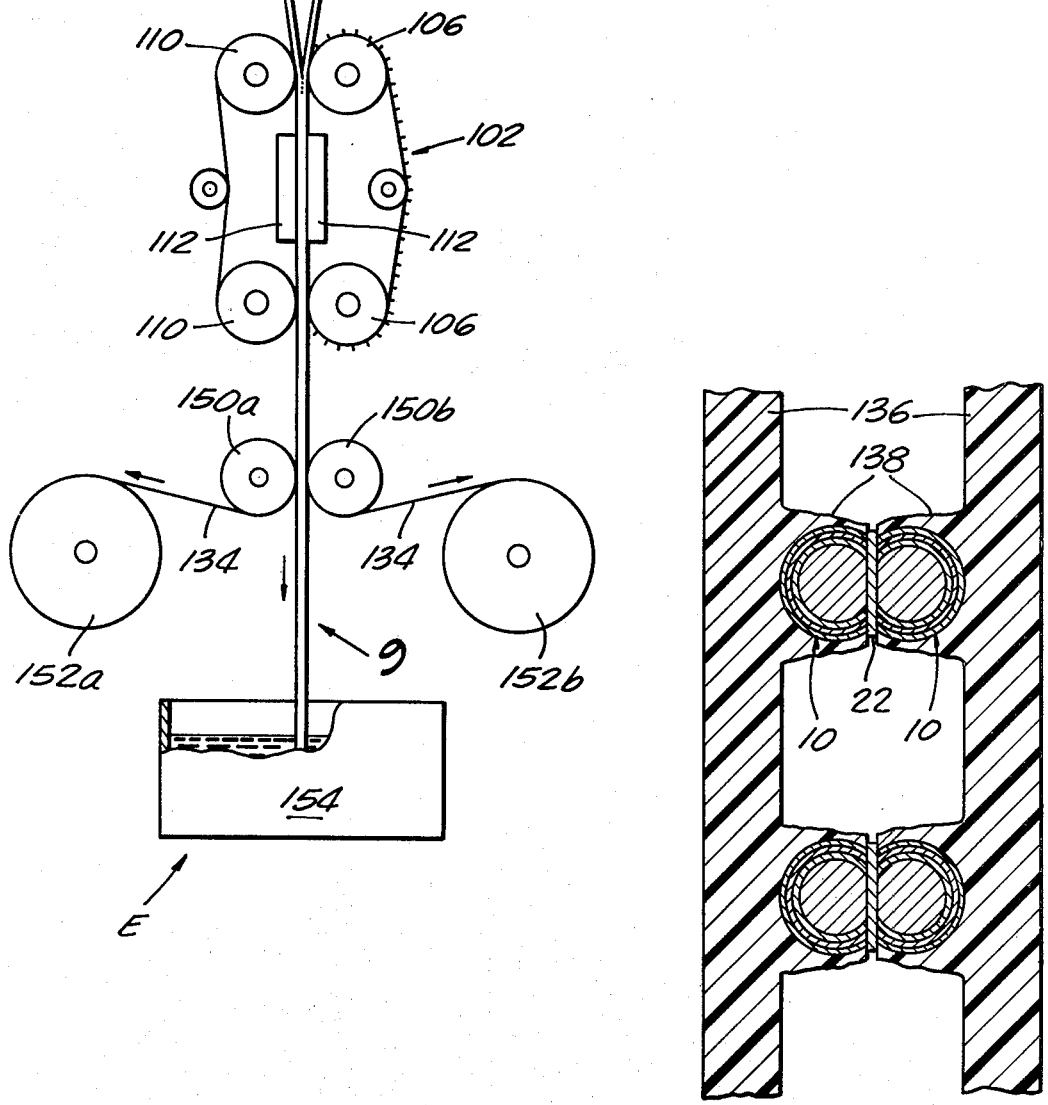
FIG. 9 is an enlarged sectional view illustrating the particle carrying means, as viewed in the area indicated at 9 in FIG. 8.

Following the abrading and tinning operation as performed in mechanism D, the finished take-off film 92 as indicated in FIG. 7 is severed at splice impressions, as previously explained, to provide two separate mirror image take-off film strips 92a and 92b which are wound on the supply reels 94a and 94b, as shown in FIG. 8.

The two film strips 92a and 92b are fed from their reels in converging paths over spaced guide rollers 146a, 146b and thence to a film registering device 102, of the character previously explained in connection with mechanism C, wherein the registered films pass between the pressure plates 112. The take-off film strips 92a and 92b are in confronting relation with their dimple formed projections 138 in face-to-face relation.

A heat generating source 148 in the form of a iodine lamp is mounted between the converging take-off film strips 92a and 92b, and generates enough heat to melt the previously applied solder film 142 on each of the tiny spheres 10 as the film strips approach the pressure plates 112 where the solder films 142 on each mirror image surface merges to achieve a solder junction. The pressure plates 112 also function as a heat sink so that the temperature of the junctions drops rapidly, and by the time the film emerges from the pressure plates, soldering will have been completed so that each sphere is joined in position with its mirror image partner.

Although a number of solders can be used, the fusible alloys have been most successful because the melting point is low, and their chemical composition is such that the use of a corrosive solder flux can be avoided. There is an additional advantage to these eutectic materials in that during soldering, a combination of the molten alloy and the metal plated on the spheres for color forming purposes tends to destroy the eutectic. After the particle has been soldered at a relatively low temperature and the fusible alloy eutectic has been destroyed, it takes a much higher temperature to again melt the solder. Following soldering, the bonded together films advance to a position between a pair of rollers 150a and 150b where the base carrier film portions 134, 134 are conducted into substantially opposite paths to their take-up reels 152a and 152b. The remaining bonded together resin portions 136 with the soldered pairs of spheres therein, are conducted in a generally straight path to a container of solvent 154, such as tolene, methyl ethel keytone, methylene chloride or mixtures thereof, and which is sufficiently rapid acting to dissolve the resin and leave the tiny soldered pairs of spheres, in the form of the particles 12, as shown in FIG. 2. If the dissolved resin is poured off and the joined pairs of spheres rinsed with solvent, the particles can be recovered ready for use. In order to eliminate any that may be clumped or any single spheres that did not have a mate for soldering, centrifuging is suitable.

From the foregoing description, the uses, advantages, and operation of the present invention will be rapidly understood to those skilled in the art to which the invention appertains. While certain forms of the invention have been described, which are now considered to be the best embodiments thereof, it is to be understood that the forms shown are merely illustrative and that the invention is not to be limited to the details disclosed herein, but is to be accorded the full scope of the appended claims.

We claim:

1. Apparatus for producing high sensitivity magneto-chemical particles on a mass basis, in which a pair of magnetic metallic spheres are magnetically oriented and interconnected by bonded surface portions, which comprises the combination of:
    a. conveyor belt means having magnetic sphere receiving means for forming and moving successive mirror image group formations of magnetic metallic spheres along a processing path;
    b. means for applying a fluid resin coating to the spheres to bind and hold the spheres in the group formations;
    c. means for magnetically orienting said spheres in a predetermined magnetic polar axis before hardening of said resin;
    d. means for separating said mirror image group formations from said sphere receiving means;
    e. means for positioning the spheres of the mirror image group formations in face-to-face relation with the spheres forming discrete pairs; and
    f. means for soldering confronting surface portions of said pairs to form unitary particles.

2. Apparatus according to claim 1, including:
    means for abrading a corresponding surface area of each of said spheres; and in which the soldered confronting surface portions comprise said abraded surface areas.

3. Apparatus for producing high sensitivity magnetochemical particles on a mass basis, in which a pair of magnetic metallic spheres are magnetically oriented and interconnected by bonded surface portions, which comprises the combination of:
   a. conveyor film belt means having magnetic sphere receiving means for forming and moving successive mirror image group formations of magnetic metallic spheres along a processing path;
   b. means for applying a fluid resin coating to the spheres to bind and hold the spheres in the group formations;
   c. means for subjecting the spheres, before the resin hardens, to a directional magnetic field to similarly orient the spheres in a predetermined magnetic axis;
   d. means for separating said mirror image group formations from said sphere receiving means
   e. means for abrading a corresponding surface area of each of said spheres;
   f. means for positioning the abraded areas of the spheres of the mirror image groups in contact engagement; and
   g. means for soldering the engaged abraded areas of the spheres to form a particle having a pair of magnetically oriented and bonded spheres therein.

4. Apparatus according to claim 3 in which:
the sphere receiving means comprises mirror image formations of surface dimples impressed on said conveyor belt; and
the spheres are respectively seated in said dimples.

5. Apparatus according to claim 4 in which:
the mirror image formations of the dimples are impressed on the opposite surfaces of a film strip; and
said film strip has connected ends joined to provide a mobius loop structure.

6. Apparatus according to claim 4 which includes:
means for supplying spheres to the dimpled surface of said belt; and
means for moving the spheres over the belt surface to seat the spheres in said dimples.

7. Apparatus according to claim 6, in which:
the means for supplying the spheres comprises a vibratory V-shaped hopper supported to extend above and transversely across the upper surface of said belt; and
said hopper having bottom outlet openings for the delivery of the spheres onto the belt surface.

8. Apparatus according to claim 6, in which:
the sphere moving means includes a series of fine brushes engageable with the upper surface of the belt; and
said brushes being supported for linear, reciprocable movements.

9. Apparatus according to claim 6, in which:
the sphere moving means includes a rotatable disc having a resilient surface for engaging and rolling the spheres over the conveyor surface.

10. Apparatus according to claim 4, in which:
the fluid resin material is applied as a stream to the dimpled upper surface of the belt; and
spreader means disperses the stream of resin in a manner to provide a binder coating over the dimpled surface and around the spheres seated in said dimples.

11. Apparatus according to claim 10, in which:
the spreader means includes a bar member supported to extend above and transversely of the upper surface of said belt; and
said bar being adjustable to vary its spaced relation to the upper surface of said belt.

12. Apparatus according to claim 4, in which:
the means for subjecting the spheres to a directional magnetic field comprises a pair of elongate bar magnets positioned adjacent to and extending along the opposite edges of said belt; and
said bars being transversely magnetized to provide confronting poles of opposite polarity on the opposite sides of the belt.

13. Apparatus according to claim 4, in which: said separating means comprises
means for stripping and transferring the resin coating and integral resin dimple formed projections with the spheres at their ends, as contained in the successive mirror group formations, from said conveyor belt means to a separate take-off film strip.

14. Apparatus according to claim 13, in which:
said stripping and transfer means comprises:
   means for moving said take-off film strip in a path of movement including a path portion in which a surface of the take-off strip is in parallel confronting overlying relation to the resin coating on said film belt;
   means for applying an adhesive to said confronting surface prior to its entering said path portion;
   means for maintaining the take-off film and said film belt in synchronized accurate registration;
   means at said path portion for pressing the take-off film and the film belt together to adhesively secure the take-off strip to the surface of said resin coating; and
   means for subsequently relatively moving the take-off strip and film belt in diverging directions to strip the resin coating and the integral resin dimple formed projection and supported spheres from the film belt.

15. Apparatus according to claim 13, in which:
the means for abrading the spheres comprises:
   means for moving said take-off film strip, with the attached resin coating and integral resin dimple formed projections with the spheres at their ends, in a processing path; and
   a rotatably mounted abrasive roller.

16. Apparatus according to claim 15, which includes:
means for applying a tinning solder film to said abraded surface areas.

17. Apparatus according to claim 16, in which:
said tinning means includes a dipping roller; and
a roller wiper blade.

18. Apparatus according to claim 13, in which:
the means for positioning the abraded areas of the spheres in contact engagement comprises:
means for feeding two of said separate take-off film strips, each having an attached resin coating and integral resin dimple formed projections each supporting a sphere with an abraded pretinned surface area, in converging paths to bring the tinned areas of sphere pairs into confronting relation.

19. Apparatus according to claim 18, which includes:
means for maintaining the converged film strips in synchronizing accurate registration; and
the soldering means comprises:

a heat generator placed between the converging paths of said take-off film strips to melt the tinning material; and pressure plates for pressing the converged take-off film strips together with the melted tinning material of the areas in contact to complete the soldering operation between the sphere pairs.

20. Apparatus according to claim 19, which includes:
means for moving the base carrier film portions of the take-off film strips in opposite directions to separate and strip off the resin coatings with the soldered pairs of spheres therein; and means for subjecting the stripped off material to a solvent to dissolve the resin and recover the soldered sphere pairs.

21. Apparatus according to claim 3, in which:
the magnetic field rotates the spheres in the resin binder; and
the conveyor belt conducts the oriented spheres to a drying compartment to set the resin and hold the spheres in their oriented positions.

22. Apparatus according to claim 21, in which:
said drying compartment is connected with an air supply inlet and an exhaust outlet.

23. Apparatus according to claim 22, including:
means for heating the air in said compartment.

24. Apparatus according to claim 23, in which:
said heating means includes a plurality of heat generating panels longitudinally spaced above the surface of said belt; and
wherein a longitudinally intermediate one of said panels is operative at a higher temperature level than the other of said panels.

25. Apparatus according to claim 24, in which:
said exhaust outlet includes separate outlet connections communicating respectively with the interior compartment areas containing said heaters; and
separate valves in said outlet connections are selectively operable to relatively regulate the outlet air flow from the compartment areas.

26. Apparatus according to claim 23, in which:
the magnetic field means are contained in a chamber having communication with a portion of said conveyor belt; and
connection means circulates air from said exhaust outlet of the drying compartment through said chamber.

27. An apparatus for producing high sensitivity magnetochemical particles on a mass basis, comprising means for holding magnetic spheres in mirror image group formations, means for orienting said spheres, and means for bonding opposed surface portions of corresponding mirror image pairs of said magnetic metallic spheres, the improvement which includes in combination:
a mechanism for assembling and binding magnetic metallic spheres in mirror image groups, said mechanism comprising:
a conveyor belt means having magnetic sphere receiving means for forming and moving successive mirror image group formations of the metallic spheres along a processing path;
means for applying a fluid resin coating to the spheres;
means for subjecting the spheres to a directional magnetic field, while the resin coating is still liquid, to rotate the spheres into magnetic alignment with the field; and means for separating said mirror image group formations from said sphere receiving means;
means for thereafter drying the resin with warm air to retain the spheres in their magnetic field aligned position.

28. An apparatus for producing high sensitivity magnetochemical particles on a mass basis, comprising means for holding magnetic spheres in mirror image group formations, means for orienting said spheres, and means for bonding opposed surface portions of corresponding mirror image pairs of said magnetic metallic spheres, the improvement which includes in combination:
a film take-off and stripping mechanism, comprising:
means for moving said take-off film strip in a path of movement including a path portion in which a surface of the take-off strip is in parallel confronting overlying relation to a resin coating on a film conveyor belt, said coating binding and holding magnetic metallic spheres in mirror image group formations;
means for applying an adhesive to said confronting surface prior to its entering said path portion;
means for maintaining the take-off film and said film conveyor belt in synchronized accurate registration;
means at said path portion for pressing the take-off film and the film conveyor together to adhesively secure the take-off strips to the surface of said resin coating; and
means for subsequently relatively moving the take-off strip and film belt in diverging directions to strip the resin coating with the spheres from the film conveyor belt.

29. An apparatus for producing high sensitivity magnetochemical particles on a mass basis, in which a pair of magnetic metallic spheres are magnetically oriented and interconnected by bonded surface portions, the improvement which includes in combination:
a sphere joining and particle recovery mechanism, comprising:
means for feeding two separate film strips, each having an attached resin coating and integral resin dimple formed projections each supporting a sphere with an abraded pretinned surface area, in converging paths to bring the tinned areas of sphere pairs into confronting relation:
means for maintaining the converged film strips in synchronized accurate registration;
a heat generator positioned between the converging paths of said film strips to melt the tinning material on said surface areas;
pressure plates for pressing the converged film strips together with the melted tinning material of the areas in contact to complete the soldering operation between the sphere pairs;
means for moving the film strips in opposite directions to separate and strip off the resin coatings with the soldered pairs of spheres therein; and
means for subjecting the stripped off material to a solvent to dissolve the resin and recover the soldered sphere pairs.

30. The method of producing high sensitivity magnetochemical particles consisting of a pair of joined metallic magnetic spheres, which comprises the steps of:

a. fixedly supporting the spheres in mirror image groups respectively on surfaces of separate film strips;
b. abrading the surfaces of the spheres and tinning the abraded surfaces with solder to provide corresponding tinned contact surfaces;
c. feeding two of said film strips in converging paths with their sphere supporting surfaces confronting to form discrete pairs of spheres with engaged contact surfaces; and
d. bonding the spheres of the discrete pairs together by melting the solder on the tinned contact surfaces prior to their engagement.

31. The method of producing high sensitivity magnetochemical particles consisting of a pair of joined metallic magnetic spheres, which comprises the steps of:

a. supporting the spheres in a predetermined group pattern formed by minute sphere receiving seating depressions in the surface of a conveyor belt;
b. suspending the seated spheres in a layer of fluid resin;
c. subjecting the resin suspended spheres to a directional magnetic field to cause rotation of the spheres, prior to hardening of the resin, into positions in which their pre-established magnetizable axis are aligned with the direction of the directional field and in parallel relation to the surface of said belt;
d. thereafter removing said group pattern of spheres from said conveyor belt and positioning one portion of the spheres of the group pattern in mirror image engagement with another portion of the spheres of the group pattern to form a plurality of engaged sphere pairs; and
e. bonding the engaged sphere pairs together.

* * * * *